United States Patent
Zhang et al.

(10) Patent No.: US 9,602,294 B1
(45) Date of Patent: Mar. 21, 2017

(54) RENDEZVOUS POINT LINK RESILIENCY FOR BIDIRECTIONAL PROTOCOL INDEPENDENT MULTICAST (PIM-BIDIR)

(71) Applicant: Juniper Networks, Inc., Sunnyvale, CA (US)

(72) Inventors: Zhaohui Zhang, Westford, MA (US); Kurt J. Windisch, Bend, OR (US); Jaroslaw Adam Gralak, Schiphol-Rijk (NL)

(73) Assignee: Juniper Networks, Inc., Sunnyvale, CA (US)

( * ) Notice: Subject to any disclaimer, the term of this patent is extended or adjusted under 35 U.S.C. 154(b) by 123 days.

(21) Appl. No.: 14/042,633

(22) Filed: Sep. 30, 2013

(51) Int. Cl.
*H04L 12/18* (2006.01)

(52) U.S. Cl.
CPC .................... *H04L 12/18* (2013.01)

(58) Field of Classification Search
CPC ..... H04L 12/1886; H04L 12/18; H04L 45/16; H04L 67/00
USPC .......................................................... 370/390
See application file for complete search history.

(56) References Cited

U.S. PATENT DOCUMENTS

2013/0294448 A1* 11/2013 Mentze ................... H04L 45/16
370/390
2013/0315090 A1* 11/2013 Mentze et al. ................ 370/252

OTHER PUBLICATIONS

Handley, et al., "Bidirectional Protocol Independent Multicast (BIDIR-PIM)," Network Working Group, RFC 5015, Oct. 2007, 43 pp.

* cited by examiner

*Primary Examiner* — Kan Yuen
*Assistant Examiner* — Richard Chang
(74) *Attorney, Agent, or Firm* — Shumaker & Sieffert, P.A.

(57) ABSTRACT

Techniques provide rendezvous point link (RPL) resiliency for bidirectional protocol independent multicast (PIM-BIDIR) in a computer network. According to the techniques, when two or more RPL partitions have a same RPL subnet, routers on the RPL subnet are configured to elect an active RPL partition that will function as a RPL. The routers on any inactive RPL partitions may then treat the inactive RPL partitions as regular links in the RPL subnet and build a route to the active RPL partition. In some examples, the network is configured to include the two or more RPL partitions with the same RPL subnet as Anycast RPLs in the network. In other examples, the routers on the RPL subnet are configured to detect when an original RPL is separated into the two or more RPL partitions due to a failure of the original RPL.

25 Claims, 8 Drawing Sheets

RENDEZVOUS POINT LINK RESILIENCY FOR BIDIRECTIONAL PROTOCOL INDEPENDENT MULTICAST (PIM-BIDIR)

TECHNICAL FIELD

The invention relates to computer networks and, more particularly, to controlling delivery of multicast traffic in computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. The computer networks may enable remotely located sources and receivers to share data. In some cases, the computer network may be configured to support multicast traffic, such as Internet Protocol Television (IPTV), desktop conferences, corporate broadcasts, music and video web casts, and other forms of content. As an example, the computer network may utilize protocol independent multicast (PIM) as a multicast routing protocol to control delivery of multicast traffic from sources to receivers for particular multicast groups.

In bidirectional PIM (PIM-BIDIR), all PIM control and data traffic is sent towards a rendezvous point address (RPA) reachable from a rendezvous point link (RPL), and distributed to appropriate destinations. In this way, a source address of multicast traffic may remain unknown to the routers in the network. The routers only need to know the RPA mapped to the multicast group from which the receivers are interested in receiving traffic. In some examples, the RPA may not belong to a real router and may simply be an address reachable from the RPL. In this case, PIM-BIDIR may avoid a single point of failure at the RP. The RPL, however, may be separated into two or more partitions such that receivers and routers in one of the partitions may not be able to receive traffic over the RPL from a source in another of the partitions. Further details of PIM-BIDIR are described in Request for Comments (RFC) 5015, "Bidirectional Protocol Independent Multicast (BIDIR-PIM)," Internet Engineering Task Force, October 2007, the entire contents of which are incorporated herein by reference.

SUMMARY

In general, this disclosure describes techniques that provide rendezvous point link (RPL) resiliency for bidirectional protocol independent multicast (PIM-BIDIR) in a computer network. According to the techniques, when two or more RPL partitions have a same RPL subnet, routers on the RPL subnet are configured to elect an active RPL partition that will function as a RPL with a rendezvous point address (RPA) reachable from the RPL. The routers on any inactive RPL partitions may then operate as if the routers were on regular links in the RPL subnet in order to forward traffic to the active RPL partition. In some examples, the network is configured or designed to include the two or more RPL partitions with the same RPL subnet as Anycast RPLs. In other examples, the routers on the RPL subnet are configured to detect when an original RPL is separated into the two or more RPL partitions due to a failure of the original RPL. The techniques include some changes to PIM-BIDIR procedures and interactions between PIM and a routing protocol, such as Border Gateway Protocol (BGP) or a link state routing protocol of Internal Gateway Protocol (IGP), in the control plane of the routers on the RPL subnet.

In one example, this disclosure is directed to a method that includes participating, with a router on a rendezvous point link (RPL) subnet for bidirectional protocol independent multicast (PIM-BIDIR) in a network, in an election process with a plurality of routers on the RPL subnet to elect an active RPL partition from two or more RPL partitions with the same RPL subnet based on partition identifiers, when the router is on the active RPL partition, operating as if the router is on a RPL for a rendezvous point address (RPA) in the RPL subnet, and, when the router is on an inactive RPL partition, operating as if the router is on a regular link in the RPL subnet.

In another example, this disclosure is directed to a router on a rendezvous point link (RPL) subnet for bidirectional protocol independent multicast (PIM-BIDIR) in a network. The router includes a control unit configured to participate in an election process with a plurality of routers on the RPL subnet to elect an active RPL partition from two or more RPL partitions with the same RPL subnet based on partition identifiers, when the router is on the active RPL partition, operate as if the router is on a RPL for a rendezvous point address (RPA) in the RPL subnet, and when the router is on an inactive RPL partition, operate as if the router is on a regular link in the RPL subnet.

In a further example, this disclosure is directed to a computer-readable storage medium comprising instructions that, when executed, cause one or more programmable processors to participate, with a router on a rendezvous point link (RPL) subnet for bidirectional protocol independent multicast (PIM-BIDIR) in a network, in an election process with a plurality of routers on the RPL subnet to elect an active RPL partition from two or more RPL partitions with the same RPL subnet based on partition identifiers, when the router is on the active RPL partition, operate as if the router is on a RPL for a rendezvous point address (RPA) in the RPL subnet, and when the router is on an inactive RPL partition, operate as if the router is on a regular link in the RPL subnet.

The details of one or more examples of the invention are set forth in the accompanying drawings and the description below. Other features, objects, and advantages of the invention will be apparent from the description and drawings, and from the claims.

DETAILED DESCRIPTION

Figure 1A:
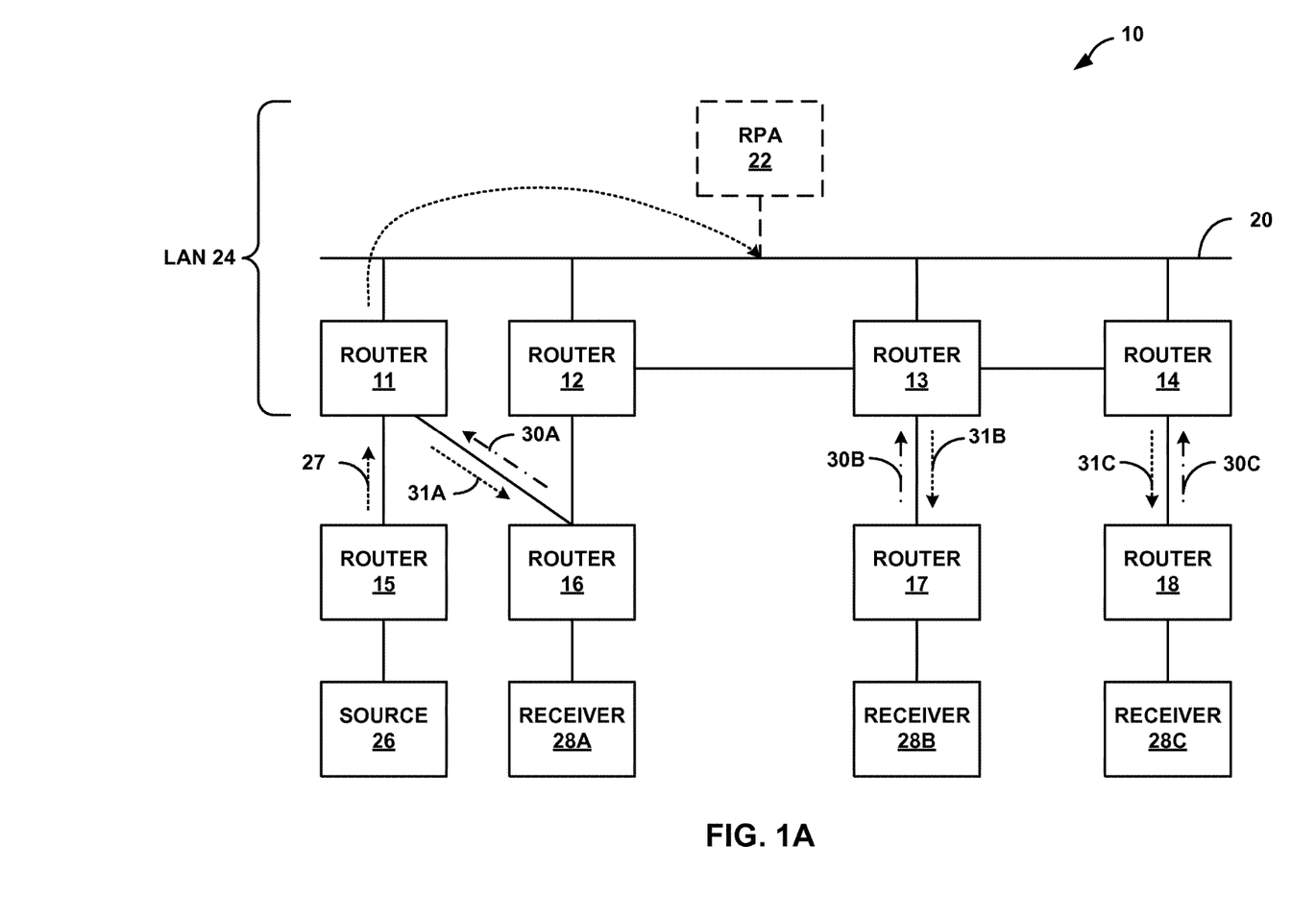
FIGS. 1A-1B are block diagrams illustrating an example computer network including routers implementing rendezvous point link (RPL) resiliency mechanisms for PIM-BIDIR before and after partitioning of the RPL.
Figure 1B:
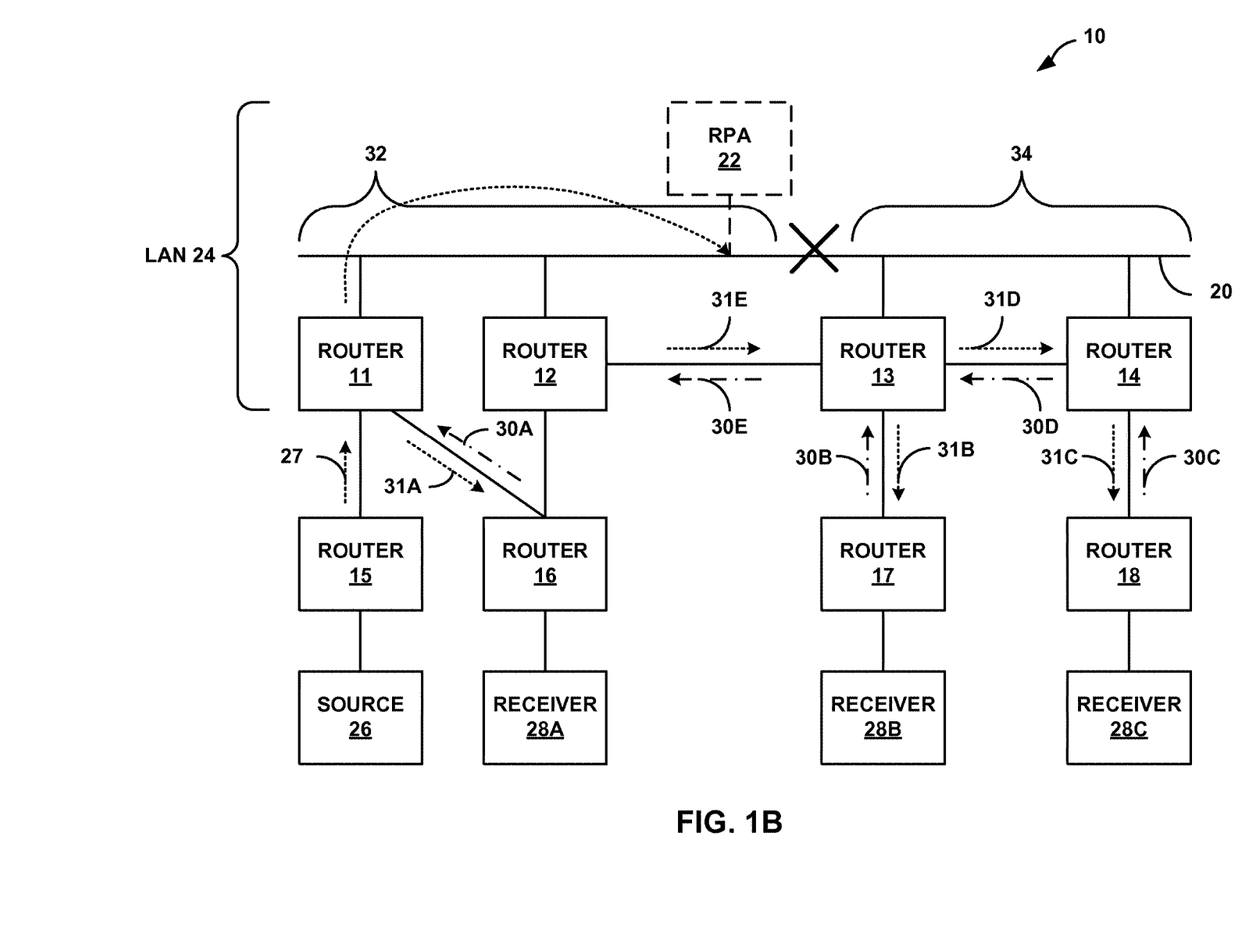

FIGS. 1A-1B are block diagrams illustrating an example computer network 10 including routers 11, 12, 13 and 14 ("routers 11-14") implementing rendezvous point link (RPL) resiliency mechanisms for bidirectional protocol independent multicast (PIM-BIDIR) before and after partitioning of RPL 20. According to the techniques of this disclosure, routers 11-14 on the RPL subnet are configured to detect when RPL 20 has separated into two or more RPL partitions and elect one of the RPL partitions as an active RPL partition that continues to function as the RPL. Each of routers 11-14 on the RPL subnet may detect the partitioning and participate in an election process with all of routers 11-14 to elect the active RPL partition based on modifications to PIM-BIDIR procedures and interactions in the control plane between PIM and a routing protocol, such as Border Gateway Protocol (BGP) or a link state routing protocol of Interior Gateway Protocol (IGP).

In the example illustrated of FIGS. 1A-1B, computer network 10 utilizes PIM-BIDIR as a multicast routing protocol to control delivery of multicast traffic from source 26 to receivers 28A-28C ("receivers 28") for particular multicast groups. Computer network 10, for example, may be an enterprise network, a campus network, a service provider network, a home network, or another autonomous system. In other examples, computer network 10 may comprise or otherwise be coupled to the Internet or another public network. In some cases, computer network 10 may comprise a multi-protocol label switching (MPLS) network. In any of these examples, source 26 and receivers 28 may share data via computer network 10.

Each of source 26 and receivers 28 may be included in a remote customer site that comprises a plurality of subscriber devices, such as media servers, desktop computers, laptops, workstations, PDAs, wireless devices, network-ready appliances, file servers, print servers or other devices. As one example, each of source 26 and receivers 28 may comprise one or more servers or employee computer terminals located in different regions of a single office location. As another example, each of source 26 and receivers 28 may be located at a remote office location of a corporation such that network 10 may be extended across a public network, such as the Internet. The remote sites may be configured to support multicast traffic, such as Internet Protocol Television (IPTV), desktop conferences, corporate broadcasts, music and video web casts, and other forms of content.

Computer network 10 includes routers 11, 12, 13, 14, 15, 16, 17 and 18 ("routers 11-18") with RP address (RPA) 22 for PIM-BIDIR. Each of routers 11-18 exchange periodic PIM Hello messages with neighboring routers to identify themselves as PIM neighbor devices in the shared tree. Once routers 11-18 have discovered their PIM neighbors, routers 11-18 may send PIM control messages on behalf of receivers 28 requesting to join or prune a particular multicast group. In PIM-BIDIR, the PIM control messages identifying the multicast group use a generic source (*, group) key. PIM-BIDIR uses group state, not source-specific state, to forward multicast traffic for the particular multicast group from source 26 toward RPA 22 for distribution to requesting receivers 28 via routers 11-18 in the shared tree.

In accordance with PIM-BIDIR, routers 11-18 forward all PIM control and data traffic toward RPA 22 reachable from RPL 20, and distribute the traffic to appropriate destinations. In this way, an address of source 26 of multicast traffic may remain unknown to routers 11-18 in the shared tree. In addition, addresses of receivers 28 interested in receiving the multicast traffic may remain unknown to source 26. Routers 11-18 only need to know RPA 22 mapped to the multicast group for which source 26, and any other sources, generates traffic and from which receivers 28 request to receive multicast traffic. In this way, PIM-BIDIR reduces an amount of state maintained at each of routers 11-18.

In general, PIM-BIDIR is a simple, powerful and scalable multicast routing protocol that is completely control plane-driven and includes no data plane events. PIM-BIDIR controls multicast data traffic using a rendezvous point tree (RPT) with no source-specific states that would require switching to a shortest path tree (SPT). In addition, no registration or encapsulation is needed to forward traffic over the RPT. Instead, PIM-BIDIR uses native forwarding upstream towards RPL 20 and downstream towards receivers 28.

In the illustrated example, routers 11, 12, 13 and 14 are interconnected on RPL 20, which is a local area network (LAN) 24, such as an Ethernet network. LAN 24 may define a RPL subnet address space, e.g., 192.0.2.0/24, such that each of RPA 22 and routers 11-14 have addresses in the same RPL subnet. Although not shown, LAN 24 may comprise one or more layer two (L2) switches and other networking components interconnected by physical links or other network interconnects. RPA 22 is illustrated using dashed lines because RPA 22 is an address reachable from RPL 20 and does not necessarily belong to a real router. In the case where RPA 22 does belong to a real router, RPA 22 may be a RPL-facing interface address of one of routers 11, 12, 13 and 14 on RPL 20. In the case where RPA 22 does not belong to a real router, RPA 22 may be referred to as a phantom RP. With a phantom RP, PIM-BIDIR avoids a single point of failure at the RP because RPA 22 never fails and is reachable from anywhere on RPL 20. In this way, PIM-BIDIR inherently provides some RP resiliency.

As illustrated in FIG. 1A, source 26 sends multicast traffic for a particular multicast group toward RPA 22 as illustrated by arrow 27 via intermediate router 15 and router 11 on the RPL subnet. Source 26 may send the multicast traffic toward RPA 22 regardless of whether any of receivers 28 have requested the multicast traffic. If none of receivers 28 have requested to receive the multicast traffic for the multicast group, routers 11-14 on RPL 20 for RPA 22 will simply discard the multicast traffic received from source 26 because routers 11-14 have not received PIM join requests for the multicast group from receives 28.

When receiver 28A wants to receive the multicast traffic for the multicast group, intermediate router 16 sends a PIM join request for the multicast group towards RPA 22 as illustrated by arrow 30A via router 11 on the RPL subnet. As discussed above, the PIM join request identifies the particular multicast group using a generic source (*, group) key. Upon receiving the PIM join request, router 11 will begin forwarding the requested multicast traffic that it receives from source 26 as illustrated by arrow 31A to intermediate router 16 for requesting receiver 28A. In other examples, intermediate router 16 may send the PIM join request toward RPA 22 via router 12 on the RPL subnet. In this case, router 12 will begin forwarding the requested multicast traffic that it receives from RPL 20 to intermediate router 16 for requesting receiver 28A.

When receiver 28B wants to receive the multicast traffic for the multicast group, intermediate router 17 sends a PIM join request for the multicast group toward RPA 22 as illustrated by arrow 30B via router 13 on the RPL subnet. Similarly, when receiver 28C wants to receive the multicast traffic for the multicast group, intermediate router 18 sends a PIM join request for the multicast group toward RPA 22 as illustrated by arrow 30C via router 14 on the RPL subnet. Upon receiving the PIM join request, router 13 forwards the requested multicast traffic received from RPL 20 as illustrated by arrow 31B to intermediate router 17 for requesting receiver 28B, and router 14 forwards the requested multicast traffic received from RPL 20 as illustrated by arrow 31C to intermediate router 18 for requesting receiver 28C.

As discussed above, PIM-BIDIR provides some RP resiliency in the case where RPA 22 comprises a phantom RP reachable from anywhere on RPL 20 because a phantom RP does not fail, unlike a real router. As illustrated in FIG. 1B, however, a link failure (shown as a black X) may separate RPL 20 into a first RPL partition 32 and a second RPL partition 34. For purposes of this disclosure, a RPL partition is defined as a link or segment in a network that has the same subnet address as another link or segment in the network. In the example of FIG. 1B, first RPL partition 32 and second RPL partition 34 are two distinct segments that have the same RPL subnet due to a failure of original RPL 20. In other examples, as described below with respect to FIGS. 2A-2B, first and second RPL segments that have the same RPL subnet may be intentionally positioned in a network as Anycast RPLs.

In an example where the link between router 12 and router 13 fails in addition to the failure of RPL 20 shown in FIG. 1B, network 10 completely separates into a first network partition and a second network partition. In this case, each of the first and second network partitions may continue to function separately using a respective one of first and second RPL partitions 32, 34 as an RPL for intra-partition multicast traffic. For example, after the complete network partition, traffic may continue to flow between source 26 and receiver 28A over first RPL partition 32 within the first network partition.

In the case of a RPL partition in which the network remains whole, as illustrated in FIG. 1B, conventionally, routers 11-14 on the RPL subnet will continue to operate as if they are still connected to a single RPL partition for the RPL subnet. For example, without the techniques described in this disclosure, routers 11 and 12 on the RPL subnet will continue to treat first RPL partition 32 as the RPL. First RPL partition 32 may continue to receive the multicast traffic from source 26 via router 11 on the RPL subnet. In addition, receiver 28A may continue to receive the requested multicast traffic via router 11 or router 12 on the RPL subnet. First RPL partition 32, however, is unable to transmit the multicast traffic past the point of failure to second RPL partition 34.

In addition, without the techniques described in this disclosure, routers 13 and 14 on the RPL subnet will continue to treat second RPL partition 34 as the RPL and expect to receive the multicast traffic from second RPL partition 34. However, due to the failure of RPL 20, routers 13 and 14 cannot receive the multicast traffic from source 26 via second RPL partition 34, and receivers 28B and 28C are unable to continue receiving the requested multicast traffic after the failure of RPL 20.

The techniques of this disclosure provide RPL resiliency for PIM-BIDIR. According to the techniques of this disclosure, routers 11-14 on the RPL subnet are configured to detect when RPL 20 has separated into two or more RPL partitions, and elect one of the RPL partitions as an active RPL partition that continues to function as the RPL. Any of routers 11-14 on the inactive RPL partitions are configured to stop treating the inactive RPL partitions as the RPL, and instead operate as if they are on regular links in the RPL subnet. The routers on the inactive RPL partitions may then forward all joins and traffic toward the active RPL partition. Each of routers 11-14 on the RPL subnet may detect the partitioning and participate in an election process with all of routers 11-14 to elect the active RPL partition based on some changes to PIM-BIDIR procedures and interactions between PIM and routing protocols, such as BGP or a link state routing protocol of IGP, in the control plane.

Conventionally in PIM-BIDIR, PIM routers treat a given link as a RPL when the route from the PIM router towards the RPA is directly over the given link. In order to provide RPL resiliency, routers 11-14 are configured to implement modifications to the PIM-BIDIR procedures and treat a given link as a RPL when: (1) the route from the PIM router towards RPA 22 is directly over the given link, i.e., the conventional condition, and (2) the PIM router is on the elected active RPL partition. The additional condition in the modified PIM-BIDIR procedures allows routers 11-14 to treat the inactive RPL partitions as ordinary links in order to forward PIM control and data traffic to, and receive data traffic from the elected active RPL partition, instead of the inactive RPL partition. In the case of no RPL partitioning, the active RPL partition is the one and only "partition" of the RPL, i.e., the RPL itself.

In the example illustrated in FIG. 1B, after the failure of RPL 20, routers 11-14 may detect that RPL 20 is separated into first RPL partition 32 and second RPL partition 34 based on receipt of two partition identifiers for the same RPL subnet. Routers 11-14 then elect an active RPL partition from the first and second RPL partitions 32, 34 based on the partition identifiers received for each of first and second RPL partitions 32, 34. In one example, the partition identifiers are advertising routers of link states that identify the RPL subnet and are reachable by routers 11-14 for each of the RPL partitions 32, 34. In the Open Shortest Path First (OSPF) link state protocol, the link states may be network link state advertisements (Network LSAs), a stub link advertisement for a stub network in a Router LSA, or network summary LSAs. In the Intermediate System to Intermediate System (IS-IS) link state protocol, the link states may be carried in link state packets (LSPs). In another example, the partition identifiers are host routes to interface addresses of one or more of routers 11-14 on each of the RPL partitions 32, 34. Example operations of detecting RPL partitioning and electing the active RPL partition are described in more detail below with respect to the different types of partition identifiers.

As one example, routers 11-14 on the RPL subnet may participate in an election process to elect first RPL partition 32 to be the active RPL partition. Routers 11 and 12 on first RPL partition 32 then operate as if routers 11 and 12 are on a RPL for RPA 22. Routers 13 and 14 on second RPL partition 34 operate as if routers 13 and 14 are on a regular link instead of a RPL. In order for other routers in network 10 (including routers 13 and 14 on the RPL subnet and those routers not on the RPL subnet) to forward PIM control and data traffic to the active RPL partition, each of routers 11 and 12 on the elected active RPL partition, i.e., first RPL partition 32, advertises a host route to RPA 22. The host route is a more specific route directly to RPA 22 instead of to the RPL subnet. The host route may be advertised as a stub link in a router LSA using an IGP link state routing protocol such as OSPF. A PIM router advertises a host route to the RPA only if it treats a link as the RPL. Routers 11 and 12, therefore, may use the link state routing protocol of IGP to advertise host routes to RPA 22 based on PIM instructions when first RPL partition 32 is treated as the RPL in accordance with the modified PIM-BIDIR procedures. Routers 13 and 14 on the inactive RPL partition, i.e., second RPL partition 34, must stop advertising host routes to RPA 22.

Routers 13 and 14 on the inactive RPL partition, i.e., second RPL partition 34, operate as if they are on a regular link instead of a RPL, including performing a designated forwarder (DF) election on second RPL partition 34 to elect a DF for second RPL partition 34. In PIM-BIDIR, one router on each regular link toward RPA 22 is elected to function as the DF for the link. A DF is not elected on the RPL. Routers 13 and 14, therefore, perform a DF election on second RPL partition 34 when routers 13 and 14 stop treating second RPL partition 34 as the RPL. As an example, router 13 may be elected the DF for second RPL partition 34 and perform the DF responsibilities as in conventional PIM-BIDIR.

In the illustrated example of FIG. 1B, for receiver 28B to continue receiving the multicast traffic, router 13 sends a PIM join request for the multicast group toward RPA 22 as illustrated by arrow 30E via router 12 on first RPL partition 32. Similarly, for receiver 28C to continue receiving the multicast traffic, router 14 sends a PIM join request for the multicast group as illustrated by arrow 31D to router 13. Router 13 may have already sent the PIM join request to router 12 on the active RPL partition. Router 12 then forwards the requested multicast traffic received from first RPL partition 32 as illustrated by arrow 31E to router 13 for requesting receivers 28B and 28C. Router 13 further forwards the traffic as illustrated by arrow 31D to router 14 for requesting receiver 28C.

In addition to performing the DF election on the inactive RPL partition, routers 13 and 14 that have interfaces on the inactive RPL partition, i.e., second RPL partition 34, treat the inactive RPL partition as if it were a non-RPL interface. Based on the result of the DF election, routers 13 and 14 behave as if the inactive RPL partition was not an RPL with respect to data packet forwarding rules, source-only branches, directly connected receivers, and PIM join/prune processing. The behavior of routers on non-RPL links is described in more detail RFC 5015, the entire contents of which are incorporated herein by reference. For example, routers 13 and 14 on the inactive RPL partition may stop forwarding traffic upstream to the inactive RPL partition. As another example, routers 13 and 14 on the inactive RPL partition may forward traffic downstream to the inactive RPL partition when a PIM join request has been received from another router on the link. As a further example, PIM join requests may be propagated from the inactive RPL partition towards the active RPL partition using normal PIM-BIDIR join request propagation rules for non-RPL links.

All of the RPL partitions, i.e., first RPL partition 32 and second RPL partition 34, are identified by partition identifiers associated with the routers on the RPL partitions. For example, first RPL partition 32 may be identified by a network LSA with a LSA ID that is the interface address of router 11 on first RPL partition 32. In some cases, one or more routers on first RPL partition 32 may instead advertise stub networks in router LSAs. During the active RPL partition election, a network LSA may be preferred over a stub network in a router LSA. As another example, first RPL partition 32 may be identified by a host route with a host route address that is the interface address of router 11 on the first RPL partition 32. Routers 11-14 on the RPL subnet determine whether they are in the active RPL partition by checking whether they are neighbors with the identifying router, e.g., router 11, on the active RPL partition. Routers 11-14 may perform the neighbor check using either an IGP link state routing mechanism (e.g. OSPF Hello) or a PIM Hello. In either case, routers 13-18 should perform a fast neighbor change detection, e.g., via bidirectional forwarding detection (BFD) or a short Hello interval.

Two example operations of detecting RPL partitioning and electing the active RPL partition are described with respect to the different types of partition identifiers. For the detection and election procedures, each of first and second RPL partitions 32, 34 is represented by one or more partition identifiers. As discussed above, the partition identifiers may be advertising routers of link states that identify the RPL subnet and are reachable by routers 11-14 on the RPL subnet, or host routes to interface addresses of at least one of routers 11-14 on each of the RPL partitions 32, 34.

In a first example operation, routers 11-14 on the RPL subnet may use host routes advertised by any protocol to elect the active RPL partition. In each of first and second RPL partitions 32, 34, routers 11-14 on the RPL subnet learn of each other by way of PIM Hellos. At least one of the PIM neighbors, e.g., the PIM router with the lowest interface address on the RPL subnet or the PIM router with the highest interface address on the RPL subnet, advertises a host route to its own interface address. The host route may be advertised as a stub link in the router LSA using an IGP link state routing protocol such as OSPF, or a BGP network layer reachability information (NLRI) for the associated router. Optionally, the one of the PIM neighbors with the second lowest or second highest interface address may also advertise a host route to its own interface address, or all of the PIM neighbors on the RPL subnet may advertise host routes to their own interface addresses. The advertised host routes represent all the RPL partitions in the network, potentially with N:1 mapping.

Routers 11-14 on the RPL subnet receive all the advertised host routes that fall into the RPL subnet range, and select one of the host routes based on a comparison between the host route addresses. For example, routers 11-14 may select the one of the host routes with the lowest host route address. In other examples, routers 11-14 may select the one of the host routes with the highest host route address. The selected host route identifies a router that represents the elected active RPL partition. If one of routers 11-14 on the RPL subnet is not a neighbor with the identified router, then the one of routers 11-14 is not on the active RPL partition.

As an example, routers 11-14 elect the active RPL partition to be first RPL partition 32 identified by the selected host route with the host route address that is the interface address of router 11. Router 12 is neighbors with router 11 and is on the active RPL partition. Routers 13 and 14 are not neighbors with router 11 and, therefore, are not on the active RPL partition.

Whenever a host route to RPA 22 is added or deleted from routers 11-14 on the RPL subnet, the active RPL partition election process may be rerun. The host route approach described above may be used if RPA 22 is a phantom RP and does not belong to any real router on the RPL.

In a second example operation, routers 11-14 on the RPL subnet may use link states for the RPL subnet advertised by an advertising router using an IGP link state routing protocol to detect RPL partitioning and electing the active RPL partition. The IGP link state routing protocol may be OSPF with advertising routers of network LSAs, stub networks in router LSAs, or network summary LSAs as partition identifiers, or may be IS-IS with advertising routers of link states carried in LSPs as partition identifiers.

An RPL partition has a network LSA only when the RPL partition has OSPF adjacencies between a designated router (DR) for the RPL partition and non-DR routers. If no such adjacencies exist, then the RPL partition does not have a network LSA. In some cases, one or more routers on the RPL partition may instead advertise a stub link for a stub network in a router LSA in the OSPF case. According to the techniques of this disclosure, the advertising routers of the stub networks in the router LSAs may be used as partition identifiers for the RPL partition. The stub link for the stub network in the router LSA does not have an interface address, but the router LSA does have a router identifier (RID) of the advertising router. In this case, the RID of the router LSA may be used to identify the advertising router on the active RPL partition, similar to the network LSA ID used in the network LSA approach described below. During the active RPL partition election, if one of the RPL partitions has a network LSA, the RPL partition identified by the advertising router of the network LSA may be preferred over a RPL partition identified by an advertising router of a stub network in a router LSA.

For purposes of explanation, the techniques are described in this disclosure with respect to OSPF and network LSAs. Before the RPL partitioning, RPL 20 has a single designated router (DR), e.g., router 11, and one network LSA for the RPL subnet. After the RPL partitioning, each of first and second RPL partitions 32, 34 elects its own DR and has its own network LSA for the same RPL subnet that is reachable by the routers via other links in network 10. The DR on each of the first and second RPL partitions 32, 34 advertises a respective one of the network LSAs for the RPL subnet with a network LSA ID that is the interface address of the respective DR. In OSPF, a DR is a router interface elected on a multi-access network segment, e.g., RPL 20 or RPL partitions 32, 34, that generates link state advertisements for the segment. The network LSA lists the routers joined together by the segment.

Routers 11-14 on the RPL subnet receive all of the reachable network LSAs for the RPL subnet, and select one of the network LSAs based on a comparison between the network LSA IDs. For example, routers 11-14 may select the one of the reachable network LSAs with the lowest network LSA ID. In other examples, routers 11-14 may select the one of the reachable network LSAs with the highest network LSA ID. The network LSA ID of the selected network LSA identifies the elected active RPL partition. As an example, if the reachable network LSA advertised by router 11 has the lowest network LSA ID, routers 11-14 elect the active RPL partition to be first RPL partition 32 identified by the selected network LSA with the network LSA ID that is the interface address of the DR, i.e., router 11. If another router has an adjacency on the subnet with the DR, e.g., router 12, then router 12 is also on the active RPL partition.

Whenever a network LSA is added or deleted for the RPL subnet or its reachability changes, the active RPL partition election process may be rerun. The network LSA approach described above does not need any PIM or IGP signaling extensions or modifications if all the RPL partitions are in the same routing area, e.g., an OSPF area. This approach may be sufficient for the case where an original RPL is separated into two or more RPL partitions with the same RPL subnet due to a failure of the original RPL, as illustrated in FIGS. 1A-1B. An IGP extension may be needed, however, to use the network LSA approach in the case where two or more RPL partitions with the same RPL subnet are included as Anycast RPLs in different areas of the network, described in more detail below with respect to FIGS. 2A-2B. A similar IGP extension may be needed for the router LSA approach in the OSPF case where a RPL partition does not have a network LSA.

The host route approach works universally with any routing protocol and without any signaling changes. The host route approach may also work across autonomous system (AS) boundaries. However, the host route approach requires advertising of additional host routes, and the active RPL partition election is purely based on host route addresses. The network LSA approach works only with link state routing protocols and only works intra-AS. The network LSA approach also needs IGP extensions if multiple RPL segments are intentionally placed in different areas of the network. However, only a small amount of additional signaling is needed for inter-area Anycast RPL deployment, and the active RPL partition election prefers the RPL segments in the backbone area, which may be desired.

The techniques of this disclosure provide RPL resiliency for PIM-BIDIR. The techniques include some changes to PIM-BIDIR procedures and interactions between PIM and routing protocols, e.g., BGP or link state routing protocols of IGP, at routers on the RPL subnet. PIM-BIDIR is currently suited for densely and evenly distributed senders and receives, e.g., inventory and data gathering via a multicast query and response system. Changes to the PIM-BIDIR procedures, however, may make PIM-BIDIR better suited for general deployment scenarios and may make PIM-BIDIR an ideal solution for real multicast applications with densely populated senders and receivers that require high resilience to network partitioning, e.g., a defense network.

Figure 2A:
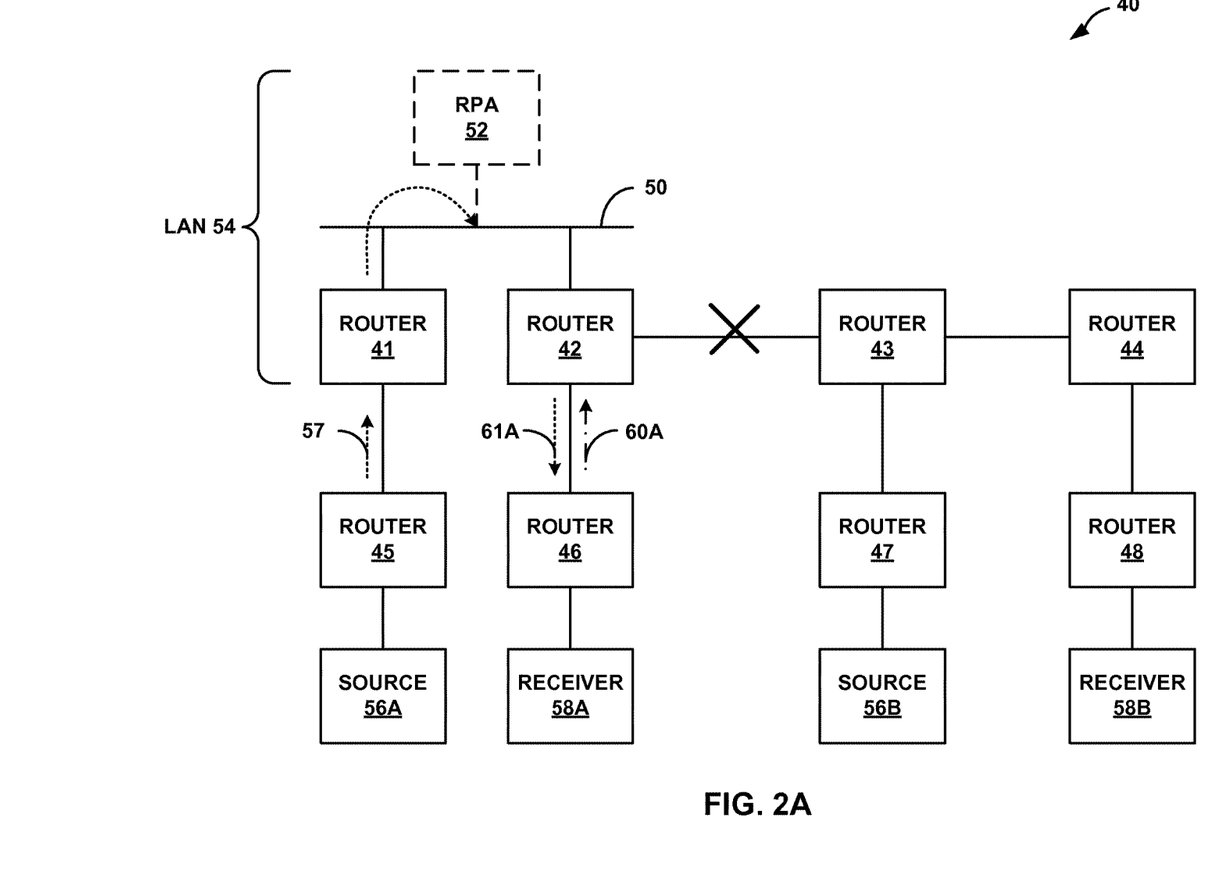
FIGS. 2A-2B are block diagrams illustrating another example computer network including routers implementing the RPL resiliency mechanisms for PIM-BIDIR before and after inclusion of additional RPL partitions as Anycast RPLs in the network.
Figure 2B:
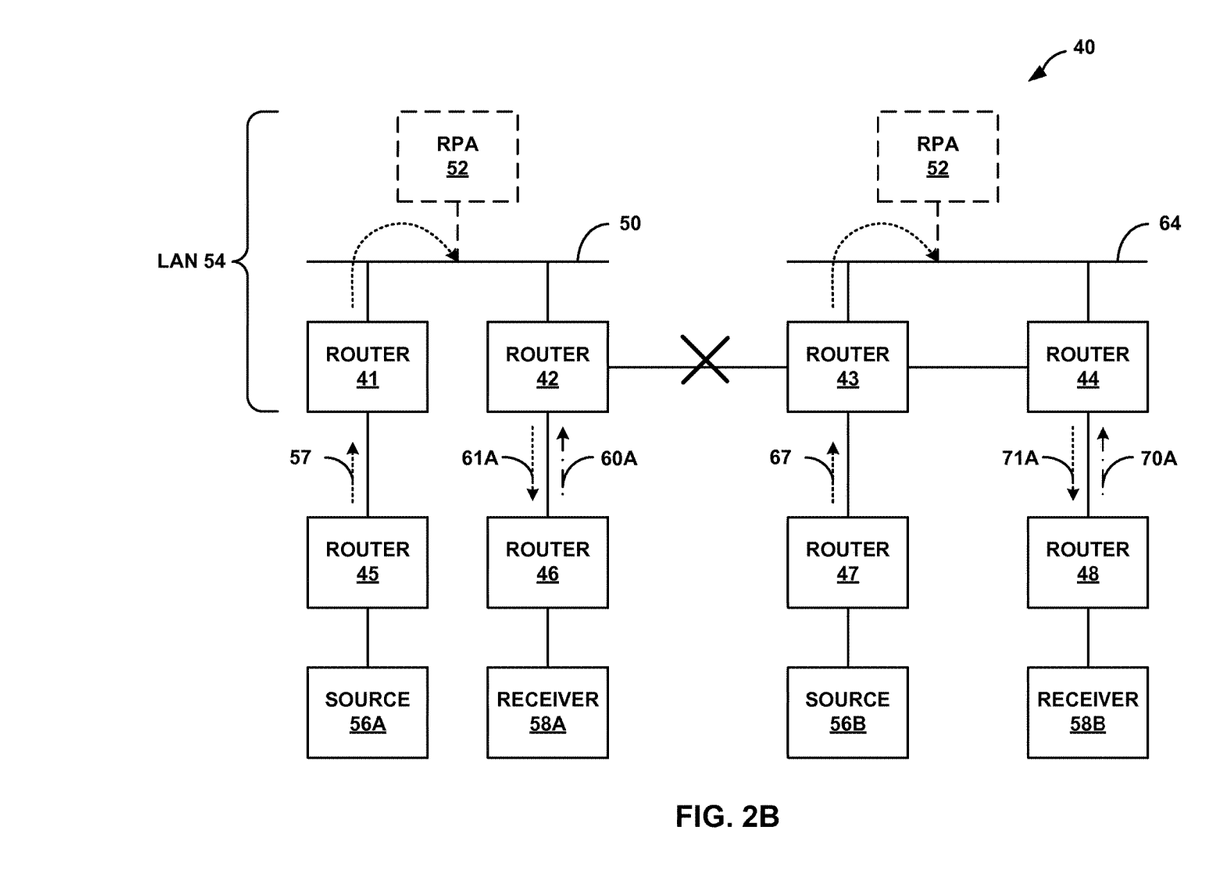

FIGS. 2A-2B are block diagrams illustrating another example computer network 40 including routers 41, 42, 43 and 44 ("routers 41-44") implementing the RPL resiliency mechanisms for PIM-BIDIR before and after inclusion of additional RPL partitions as Anycast RPLs in network 40. According to the techniques of this disclosure, routers 41-44 on the RPL subnet illustrated in FIGS. 2A-2B are configured to operate substantially similar to routers 11-14 on the RPL subnet illustrated in FIGS. 1A-1B.

In the example described with respect to FIGS. 2A and 2B, two or more RPL partitions with the same RPL subnet may be intentionally placed into network 40 as Anycast RPLs. Using the RPL resiliency mechanisms described in detail above, routers 41-44 elect one of the two or more RPL partitions as an active RPL partition that functions as the RPL. Each of routers 41-44 on the RPL subnet may participate in an election process will all of routers 41-44 to elect the active RPL partition based on modifications to PIM-BIDIR procedures and interactions in the control plane between PIM and a routing protocol, e.g., BGP or a link state routing protocol of IGP.

Computer network 40 includes routers 41, 42, 43, 44, 45, 46, 47 and 48 ("routers 41-48") with RPA 52 for PIM-BIDIR. RPA 52 is illustrated using dashed lines because RPA 52 is an address reachable from RPL 50 and does not necessarily belong to a real router. As illustrated in FIG. 2A, prior to intentionally placing a second RPL partition into network 40, only routers 41 and 42 are on the RPL subnet interconnected on RPL 50, which is a LAN 54, such as an Ethernet network.

As illustrated in FIG. 2A, source 56A sends multicast traffic for a particular multicast group toward RPA 52 as illustrated by arrow 57 via intermediate router 45 and router 41 on the RPL subnet. When receiver 58A wants to receive the multicast traffic for the multicast group, intermediate router 46 sends a PIM join request for the multicast group toward RPA 52 as illustrated by arrow 60A via router 42 on the RPL subnet. Upon receiving the PIM join request, router 42 forwards the requested multicast traffic received from RPL 50 as illustrated by arrow 61A to intermediate router 46 for requesting receiver 58A.

In the example of the single RPL 50 illustrated in FIG. 2A, a link failure (shown as a black X) between router 42 and router 43 completely separates network 40. In this case, only a first network partition may function using RPL 50 for intra-partition multicast traffic. For example, after the complete network partition, traffic may continue to flow between source 56A and receiver 58A unaffected within a first network partition. However, traffic may not flow between source 56B and receiver 58B in a second network partition because none of routers 43, 44, 47 and 48 in the second network partition have a route to RPL 50 for RPA 52.

The techniques of this disclosure may be used to mitigate the impact of network partitioning by intentionally placing RPL segments with a same RPL subnet into different parts of the network. As illustrated in FIG. 2B, in addition to RPL 50 for RPA 52, other RPLs may be included as Anycast RPLs in different parts of network 40. In some examples, the Anycast RPLs may be placed in different routing areas, such as OSPF areas, or different autonomous systems (ASes) within network 40. For example network 40 may be configured to include a second RPL 64 for RPA 52 to interconnect routers 43 and 44 on the RPL subnet. Second RPL 64 has the same subnet address as RPL 50.

The RPL resiliency mechanisms, described in detail above, may be implemented by routers 41-44 on the RPL subnet to treat the Anycast RPLs as RPL partitions with the same subnet. When network 40 is not completely partitioned, e.g., when the link between router 42 and route 43 is operational, routers 41-44 on the RPL subnet elect one of first RPL partition 50 and second RPL partition 64 as an active RPL partition that functions as the RPL. Any of routers 41-44 on the inactive RPL partitions operate as if they are on regular links in the RPL subnet.

In the example of Anycast RPLs illustrated in FIG. 2B, the link failure (shown as a black X) between router 42 and router 43 completely separates network 40 into a first network partition and a second network partition. In this case, each of the first and second network partitions may continue to function separately using a respective one of first and second RPL partitions 50, 64 as an RPL for intra-partition multicast traffic. For example, after the complete network partition, traffic may continue to flow between source 56A and receiver 58A over first RPL partition 50 within the first network partition.

In addition, traffic may flow between source 56B and receiver 58B over second RPL partition 64 within a second network partition. For example, source 56B may send multicast traffic for a particular multicast group toward RPA 52 as illustrated by arrow 67 via intermediate router 47 and router 43 on second RPL partition 64. When receiver 58B wants to receive the multicast traffic for the multicast group, intermediate router 48 sends a PIM join request for the multicast group toward RPA 52 as illustrated by arrow 70A via router 44 on second RPL partition 64. Upon receiving the PIM join request, router 44 forwards the requested multicast traffic received from second RPL partition 64 as illustrated by arrow 71A to intermediate router 48 for requesting receiver 58B.

Two example operations of electing the active RPL partition are described above with respect FIGS. 1A-1B, i.e., the network LSA approach and the host route approach. The network LSA approach described above does not need any PIM or IGP signaling extensions or modifications if all the RPL partitions are in the same routing area. The network LSA approach may need IGP extensions in the case where two or more RPL partitions with the same RPL subnet are included as Anycast RPLs intentionally positioned in different areas of the network, as illustrated in FIGS. 2A-2B. Similar IGP extensions may be needed for the router LSA approach in the OSPF case where a RPL partition does not have a network LSA.

The IGP extensions for the network LSA approach are described using OSPF as an example IGP link state routing protocol. When an area border router (ABR) advertises a Type 3 Summary LSA into a backbone area B from a non-backbone area A for a RPL subnet in area A, the Summary LSA carries a network LSA ID in a TLV for a network LSA for the subnet in non-backbone area A. In some example, the network LSA ID carried in the TLV may be the lowest network LSA ID of all the network LSAs local to area A for the subnet. When an ABR advertises a Type 3 Summary LSA into the non-backbone area A for a RPL subnet in the backbone area B, the Summary LSA carries a network LSA ID in a TLV that identifies the elected active partition for the subnet in the backbone area B.

For the active RPL partition election process, both local network LSA IDs and those in the Type 3 Summary LSAs are considered in each of the non-backbone area A and the backbone area B. In a non-backbone area A, the network LSA IDs in the Type 3 Summary LSAs received from the backbone area B are preferred over the local network LSA IDs. In the backbone area B, it is reversed such that the local network LSA IDs are preferred over the network LSA IDs in the Type 3 Summary LSAs received from the non-backbone area A. In this way, the RPL partitions in the backbone area are always preferred during the active RPL partition election process.

Figure 3:
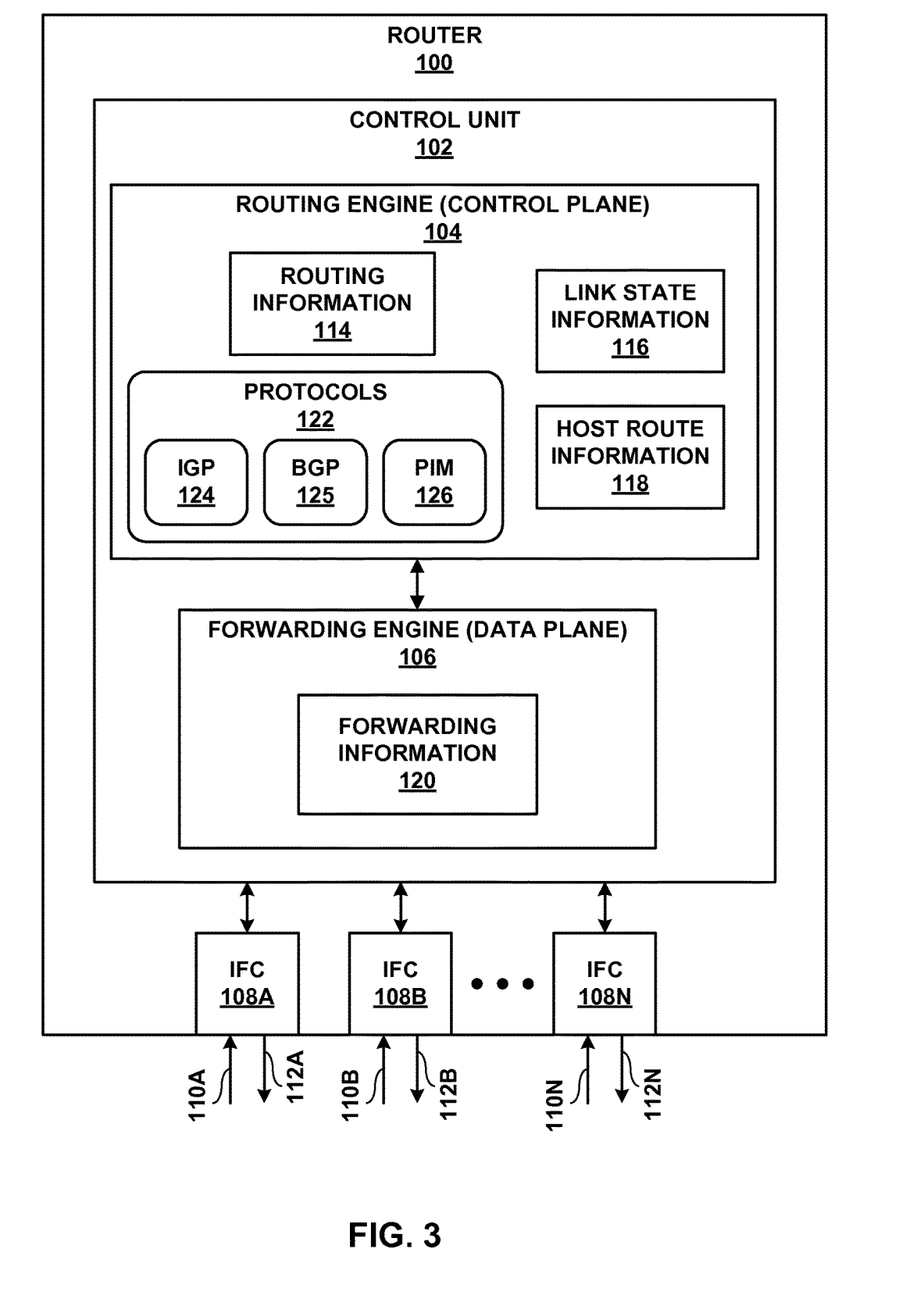
FIG. 3 is a block diagram illustrating an example router on a RPL subnet configured to execute an interaction between PIM and a routing protocol to provide RPL resiliency for PIM-BIDIR.

FIG. 3 is a block diagram illustrating an example router 100 on a RPL subnet configured to execute an interaction between PIM and a routing protocol to provide RPL resiliency for PIM-BIDIR. In general, router 100 may operate substantially similar to any of routers 11-14 on the RPL subnet illustrated in FIGS. 1A-1B, and any of routers 41-44 on the RPL subnet illustrated in FIGS. 2A-2B.

In the illustrated example, router 100 includes interface cards 108A-108N ("IFCs 108") that include a number of interface ports to receive multicast packets via incoming links 110A-110N ("incoming links 110") and to send multicast packets via outbound links 112A-112N ("outbound links 112"). IFCs 108 are typically coupled to links 110, 112 via a number of interface ports. Router 100 also includes a control unit 102 that determines routes of received packets and forwards the packets accordingly via IFCs 108.

Control unit 102 may comprise a routing engine 104 and a forwarding engine 106. Routing engine 104 operates as the control plane for router 100 and may include, for example, a hardware-based processor (e.g., a general purpose processor, DSP, ASIC or the like). The processor may, for example, execute an operating system that provides a multi-tasking operating environment for execution of a number of concurrent software processes having executable instructions. Routing engine 104 may implement one or more routing protocols 122 to execute routing processes. For example, routing protocols 122 may include an IGP 124 for exchanging routing information with other routing devices and for updating routing information 114. Routing engine 104 may implement IGP 124 for exchanging link state information with other routing devices and updating link state information 116. In the examples described in this disclosure, IGP 124 may be a link state routing protocol such as OSPF or IS-IS.

In addition, routing protocols 122 may include PIM 126, such as PIM-BIDIR, for routing traffic through a computer network with other routing devices conceptually formed into shared multicast distribution trees rooted at a RPA according to routing information 114 and state information 116. Routing engine 104 may also implement IGP 124 or BGP 125 for exchanging host route information to the RPAs of the shared trees and host route information to routers on the RPL subnet, and updating host route information 118.

Routing information 114 may describe a topology of the computer network in which router 100 resides, and may also include routes through the shared trees in the computer network. Routing information 114 describes various routes within the computer network, and the appropriate next hops for each route, i.e., the neighboring routing devices along each of the routes. For example, a given route may comprise a route for multicast traffic for a given multicast group G with a generic source.

Routing engine 104 analyzes stored routing information 114 and link state information 116 and generates forwarding information 120 for forwarding engine 106. Forwarding information 120 may associate, for example, network destinations for certain multicast groups with specific next hops and corresponding IFCs 108 and physical output ports for output links 112. Forwarding information 120 may be a radix tree programmed into dedicated forwarding chips, a series of tables, a complex database, a link list, a radix tree, a database, a flat file, or various other data structures.

In general, when router 100 receives a multicast packet via one of inbound links 110, control unit 102 determines a next hop for the packet in accordance with forwarding information 120 and forwards the packet according to the next hop. Moreover, when router 100 receives a control plane packet, such as a PIM join, prune or other message, forwarding engine 106 directs the control plane packet to routing engine 104 for processing. In this way, protocols 122, including IGP 124, BGP 125, and PIM 126, process control plane messages conforming to their respective protocols. Similarly, IGP 124, BGP 125, and PIM 126 output control plane messages for their respective protocols.

According to the techniques of this disclosure, PIM 126 and IGP 124 or BGP 125 may interact to perform the RPL resiliency mechanisms for PIM-BIDIR described herein. PIM 126 may elect one of two or more RPL partitions as an active RPL partition that functions as the RPL based on partition identifiers. For example, PIM 126 may operate according to the modified PIM-BIDIR procedures to treat or not treat a link as the RPL depending on whether router 100 is on the elected active RPL partition. IGP 124 then advertises a host route from router 100 to the RPA in the RPL subnet only if PIM 126 treats the RPL partition of router 100 as the RPL. If router 100 is on the elected active RPL partition, IGP 124 may operate to advertise a host route to the RPA based on instructions from PIM 126 to treat the elected active RPL partition as the RPL. If router 100 is on an inactive RPL partition, in order to treat the inactive RPL partition as a regular link in the RPL subnet, PIM 126 performs a DF election with other routers on the inactive RPL partition to elect a DF for the inactive RPL partition.

Moreover, according to the techniques, IGP 124 or BGP 125, or another protocol, may operate to advertise a partition identifier for the RPL of router 100 in the RPL subnet. For example, IGP 124 or BGP 125, may advertise a host route to an interface address of router 100 on one of the RPL partitions as a partition identifier for the one of the RPL partitions. As another example, router 100 may be a partition identifier for the RPL partition, and IGP 124 may advertise link states that identify the RPL subnet, e.g., a Network LSA or Router LSA in OSPF or link states carried in a LSP in IS-IS, for the RPL subnet.

In one example, PIM 126 uses the partition identifiers and other routing information from IGP 124 or BGP 125 to elect one of the two or more RPL partitions as an active RPL partition and determine if router 100 is on the elected active RPL partition. In another example, PIM 126 may send instructions to IGP 124 and, based on the instructions received from PIM 126, IGP 124 uses the partition identifiers and other routing information from IGP 124 or BGP 125 to elect one of the two or more RPL partitions as an active RPL partition and determine if router 100 is on the elected active RPL partition. In some examples, the partition identifiers may be used by IGP 124 or BGP 125 to detect that the original RPL is separated into two or more RPL partitions based on receipt of additional partition identifiers for the same RPL subnet. In one example, IGP 124 detects RPL partitioning based on receipt of additional network LSAs that are reachable by router 100 for the same RPL subnet, which IGP 124 may compare against link state information 116. In another example, IGP 124 or BGP 125 detects RPL partitioning based on receipt of additional host routes to other router interface addresses on the same RPL subnet that are not neighbors of router 11. IGP 124 or BGP 125 may compare the received host routes against host route information 118.

Two example operations of electing the active RPL partition, i.e., the network LSA approach and the host route approach, are described above with respect to FIGS. 1A-1B and 2A-2B. The host route approach and the network LSA approach when the RPL partitions are in a single routing area do not require any signaling extensions or modifications to PIM 126 or IGP124. The network LSA approach when the RPL partitions are in different routing areas, however, may need extensions to IGP 124 as described above with respect to FIGS. 2A-2B.

The architecture of router 100 illustrated in FIG. 3 is shown for exemplary purposes only. The techniques of this disclosure are not limited to implementation within a router of this architecture. In other examples, router 100 may be configured in a variety of ways. In one example, some of the functionally of control unit 102 may be distributed within IFCs 108. In another example, control unit 102 may comprise a plurality of packet forwarding engines. Control unit 102 may be implemented solely in software, or hardware, or may be implemented as a combination of software, hardware, or firmware. For example, control unit 102 may include one or more processors which execute software instructions. In that case, the various software modules of control unit 102 may comprise executable instructions stored on a computer-readable medium, such as computer memory or hard disk.

Figure 4:
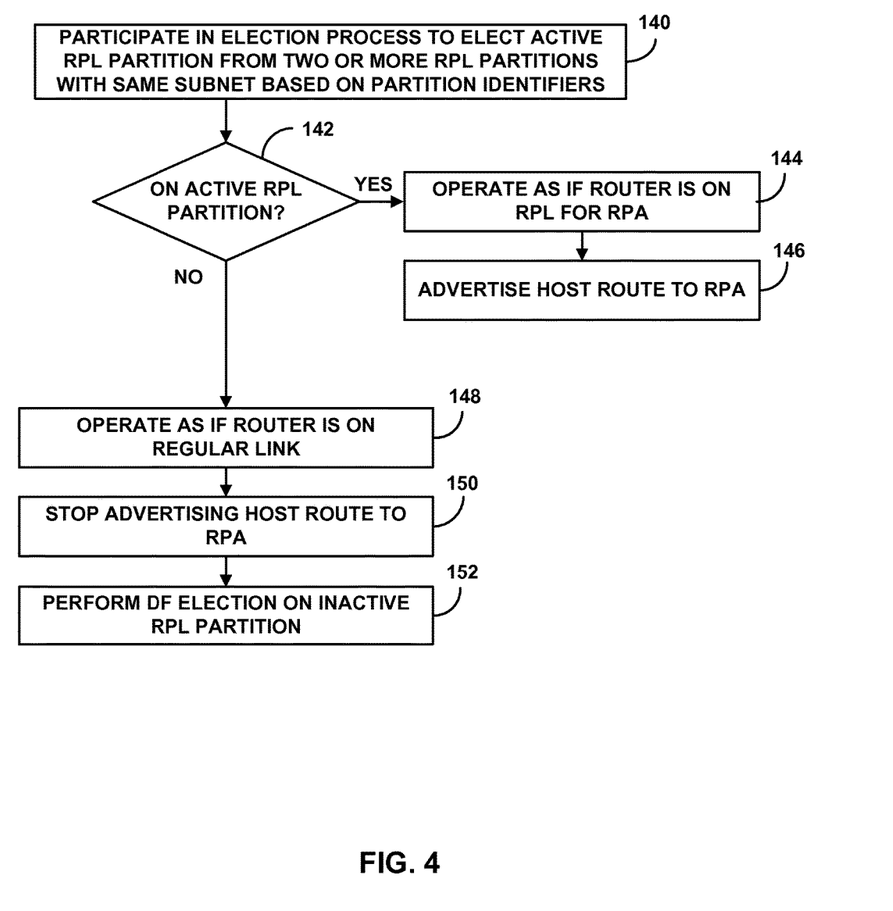
FIG. 4 is a flowchart illustrating an example operation of a router on a RPL subnet to implement the RPL resiliency mechanisms for PIM-BIDIR as described herein.

FIG. 4 is a flowchart illustrating an example operation of a router on a RPL subnet to implement the RPL resiliency mechanisms for PIM-BIDIR as described herein. The operation will be described with respect to routers 11-14 on the RPL subnet illustrated in FIG. 1B. In other examples, the operation may be performed by routers 41-44 on the RPL subnet illustrated in FIG. 2B.

Each of routers 11-14 participate in an election process with all of routers 11-14 on the RPL subnet to elect an active RPL partition from first RPL partition 32 and second RPL partition 34 with the same RPL subnet based on partition identifiers for each of the RPL partitions (140). As described in detail above, the partition identifiers may be advertising routers of reachable network LSAs for each of the RPL partitions or host routes to at least one of the routers on each of the RPL partitions. If the router is on the active RPL partition, e.g., router 11 on first RPL partition 32, (YES branch of 142), router 11 operates as if it is on the RPL for RPA 22 (144). Router 11 then advertises a host route from router 11 to RPA 22 (146).

If the router is on the inactive RPL partition, e.g., router 13 on second RPL partition 34, (NO branch of 142), router 13 operates as if it is on a regular link (148). Router 13 then stops advertising a host route to RPA 22 (150). Router 13 also performs a DF election with other routers on second RPL partition 34 to elect a DF for second RPL partition 34 (152).

Figure 5:
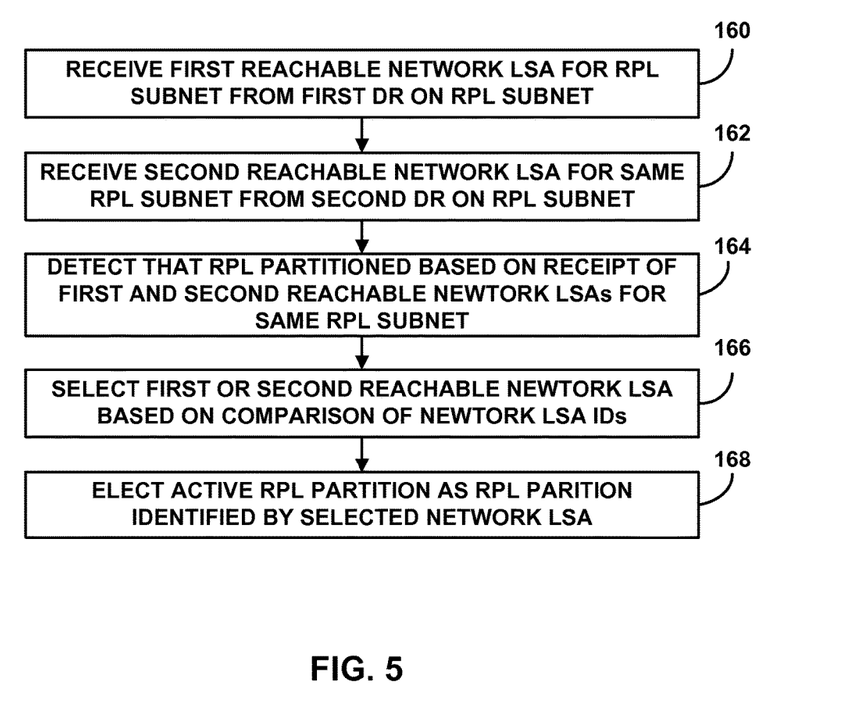
FIG. 5 is a flowchart illustrating an example operation of a router on a RPL subnet electing an active RPL partition based on reachable network link state advertisements (Network LSAs) for each of the RPL partitions.

FIG. 5 is a flowchart illustrating an example operation of a router on a RPL subnet electing an active RPL partition based on reachable network link state advertisements (network LSAs) for each of the RPL partitions. The operation will be described with respect to routers 11-14 on the RPL subnet illustrated in FIG. 1B.

Each of routers 11-14 receives a first reachable network LSA with a first network LSA ID for the RPL subnet from a first DR on the RPL subnet, e.g., router 11 (160). After RPL partitioning, each of routers 11-14 also receives a second reachable network LSA with a second network LSA ID for the RPL subnet from a second DR on the RPL subnet, e.g., router 13 (162). In this case, router 11 may remain the first DR for first RPL partition 32, and router 13 may be elected the second DR for second RPL partition 34. Each of routers 11-14 detects that RPL 20 has separated into first RPL partition 32 and second RPL partition 34 based on receipt of first and second reachable network LSAs for the same RPL subnet (164).

Routers 11-14 then select one of the first reachable network LSA and the second reachable network LSA based on a comparison of the first and second LSA IDs (166). For example, routers 11-14 may be configured to select the one of the reachable network LSAs with the lowest LSA ID. Routers 11-14 elect the active RPL partition as the one of first RPL partition 32 and second RPL partition 34 identified by the selected network LSA (168). For example, the first reachable network LSA may have the lowest LSA ID, which is the interface address for router 11 as the first DR. In this case, routers 1-14 select first RPL partition 32 on which router 11 is connected as the active RPL partition.

Figure 6:
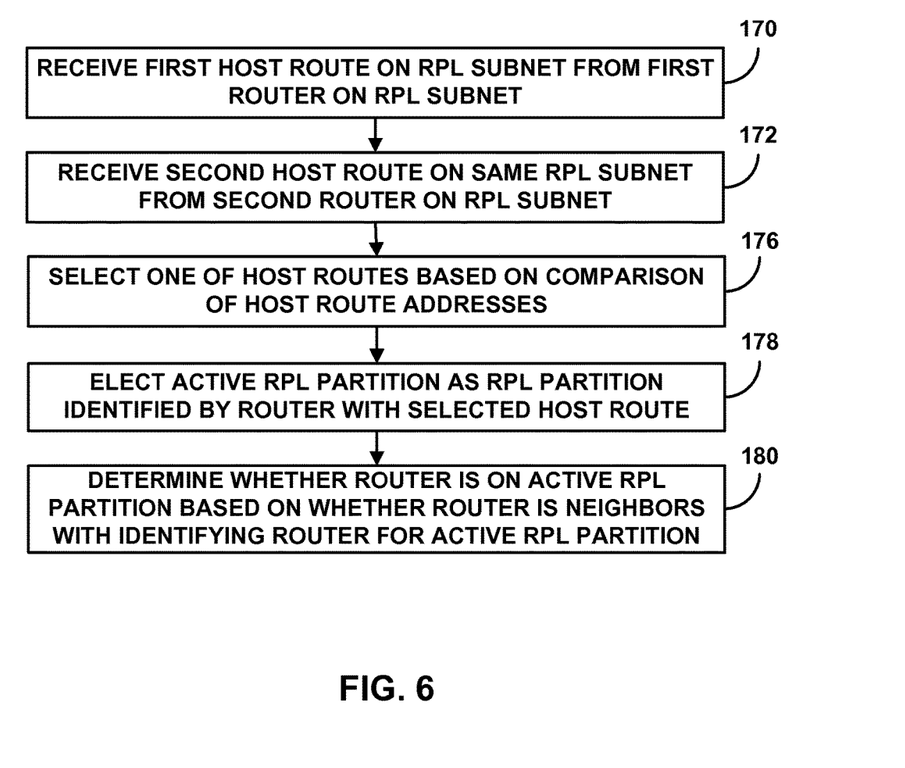
FIG. 6 is a flowchart illustrating an example operation of a router on a RPL subnet electing an active RPL partition based on host routes to at least one of the routers on each of the RPL partitions.

FIG. 6 is a flowchart illustrating an example operation of a router on a RPL subnet electing an active RPL partition based on host routes to at least one of the routers on each of the RPL partitions. The operation will be described with respect to routers 11-14 on the RPL subnet illustrated in FIG. 1B.

Each of routers 11-14 receives a first host route with a first host route address on the RPL subnet from a first router on the RPL subnet, e.g., router 11 (170). After RPL partitioning, each of routers 11-14 also receives a second host route with a second host route address on the RPL subnet from a second router on the RPL subnet, e.g., router 13 (172). In other examples, multiple host routes may be advertised by multiple routers on the same RPL partition, but whether a single or multiple routers on the same partition advertise host routes to themselves will not change the election result. The approach where more than one, or all, of the routers on each of the RPL partitions advertise host routes to the their own address speeds up convergence, provides additional resilience against failures, and facilitates make-before-break for PIM-BIDIR multicast forwarding tries associated with the RPA. By advertising all host routes and letting the routers on the RPL subnet choose the best ones based on a common algorithm e.g. preferring the lowest interface address, guarantees a true make before break.

Routers 11-14 then select one of the advertised host routes based on a comparison of the host route addresses (176). For example, routers 11-14 may be configured to select the one of the host routes with the lowest host route address. Routers 11-14 elect the active RPL partition as the one of the RPL partitions identified by a router with the selected host route (178). For example, the first host route may have the lowest host route address, which is the interface address for router 11 on first RPL partition 32. In this case, routers 1-14 select first RPL partition 32 as the active RPL partition.

Routers 11-14 then determine whether they are on the elected active RPL partition based on whether they are neighbors with the identifying router for the active RPL partition (180). In the example where router 11 is the identifying router for the active RPL partition, i.e., first RPL partition 32, router 12 is neighbors with router 11 and is on the active RPL partition. Routers 13 and 14 are not neighbors with router 11 and, therefore, are not on the active RPL partitions, but are on the inactive RPL partition, i.e., second RPL partition 34. Each of routers 11-14 on the RPL subnet may determine whether it is on the active RPL partition or not. A router is on the active RPL partition when it is the router that advertises the selected host route among all host routes that fall within the RPL subnet with the exclusion of the RPA. A router may also be on the active RPL partition when it has a PIM or IGP adjacency over the RPL with the router that advertised the selected host route. The selected host route may be the host route that, in one example, has the numerically lowest host route address or, in another example, has the numerically highest host route address among all the host routes.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform the method, e.g., when the instructions are executed. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the invention have been described. These and other examples are within the scope of the following claims.

The invention claimed is:

1. A method comprising:
   receiving, by a router on a rendezvous point link (RPL) subnet for bidirectional protocol independent multicast (PIM-BIDIR) in a network, partition identifiers from advertising routers on each of two or more RPL partitions with the same RPL subnet using a routing protocol, wherein each of the partition identifiers comprises a routing protocol advertisement that identifies an interface address of one of the advertising routers on the RPL subnet;
   selecting, by the router on the RPL subnet, one of the partition identifiers based on a comparison of interface addresses identified by the partition identifiers;
   electing, by the router on the RPL subnet, an active RPL partition as one of the two or more RPL partitions that includes the interface address of the one of the advertising routers identified by the selected one of the partition identifiers, wherein the active RPL partition is elected based on an interaction between a PIM protocol and the routing protocol executed at the router;
   when the router is on the active RPL partition, operating as if the router is on a RPL for a rendezvous point address (RPA) in the RPL subnet; and
   when the router is on an inactive RPL partition, operating as if the router is on a regular link in the RPL subnet.

2. The method of claim 1, wherein operating as if the router on the active RPL partition is on the RPL further comprises advertising, with the router on the active RPL partition, a host route to the RPA using the routing protocol based on the interaction between the PIM protocol and the routing protocol executed at the router.

3. The method of claim 2, wherein advertising the host route to the RPA based on the interaction between the PIM protocol and the routing protocol executed at the router comprises:
   receiving, by a module of the router executing the routing protocol and from another module of the router executing the PIM protocol, instructions to treat the elected active RPL partition as the RPL; and
   in response to the instructions, advertising, by the module of the router executing the routing protocol, the host route to the RPA.

4. The method of claim 1, wherein operating as if the router on the inactive RPL partition is on a regular link further comprises performing, with the router on the inactive RPL partition, a designated forwarder (DF) election with the other routers on the inactive RPL partition to elect a DF for the inactive RPL partition.

5. The method of claim 1, further comprising detecting that an original RPL is separated into the two or more RPL partitions based on receipt of two or more partition identifiers for the same RPL subnet, wherein the partition identifiers comprise one of link state advertisements that identify interface addresses of the advertising routers on the RPL subnet that are reachable by the router for each of the RPL partitions or host route advertisements that identify interface addresses of the advertising routers on each of the RPL partitions.

6. The method of claim 1,
   wherein the partition identifiers are link state advertisements received from the advertising routers on the RPL partitions,
   wherein receiving the partition identifiers comprises:
      receiving a first link state advertisement with a first interface address of a first advertising router for the RPL subnet from the first advertising router on a first RPL partition; and
      receiving a second link state advertisement with a second interface address of a second advertising router for the same RPL subnet from the second advertising router on a second RPL partition;
   wherein selecting the one of the partition identifiers comprises selecting one of the first link state advertisement or the second link state advertisement based on a comparison of the first and second interface addresses; and
   wherein electing the active RPL partition comprises electing the active RPL partition as the one of the first or second RPL partitions that includes the one of the first or second interface addresses identified by the selected one of the first or second link state advertisements.

7. The method of claim 1, further comprising advertising, with the router on one of the RPL partitions, a routing protocol advertisement that identifies an interface address of the router on the one of the RPL partitions as a partition identifier for the one of the RPL partitions.

8. The method of claim 1, wherein the partition identifiers are host route advertisements received from the advertising routers on the RPL partitions,
   wherein receiving the partition identifiers comprises:
      receiving a first host route advertisement with a first host route address on the RPL subnet from a first advertising router on a first RPL partition; and receiving a second host route advertisement with a second host route address on the same RPL subnet from a second advertising router on a second RPL partition;

wherein selecting the one of the partition identifiers comprises selecting one of the first host route advertisement or the second host route advertisement based on a comparison of the first and second host route addresses; and wherein electing the active RPL partition comprises electing the active RPL partition as the one of the first or second RPL partitions that includes the one of the first or second host route addresses identified by the selected one of the first or second host route advertisements.

9. The method of claim 1, wherein the network is configured to include the two or more RPL partitions with the same RPL subnet as Anycast RPLs.

10. The method of claim 1, wherein an original RPL for the RPA is separated into the two or more RPL partitions due to a failure of the original RPL.

11. The method of claim 1, wherein electing the active RPL partition based on the interaction between the PIM protocol and the routing protocol executed at the router comprises:

receiving, by a module of the router executing the routing protocol, the partition identifiers from the advertising routers on each of the two or more RPL partitions;

electing, by another module of the router executing the PIM protocol, the active RPL partition based on the selected one of the partition identifiers received by the module executing the routing protocol; and sending, by the another module executing the PIM protocol and to the module executing the routing protocol, instructions to treat the elected active RPL partition as the RPL.

12. The method of claim 1, wherein electing the active RPL partition based on the interaction between the PIM protocol and the routing protocol executed at the router comprises:

receiving, by a module of the router executing the routing protocol, the partition identifiers from the advertising routers on each of the two or more RPL partitions;

receiving, by the module executing the routing protocol and from another module of the router executing the PIM protocol, instructions to elect the active RPL partition based on the received partition identifiers; and in response to the instructions, electing, by the module executing the routing protocol, the active RPL partition based on the selected one of the received partition identifiers.

13. A router on a rendezvous point link (RPL) subnet for bidirectional protocol independent multicast (PIM-BIDIR) in a network, the router comprising:

a memory; and a control unit including one or more processors coupled to the memory, the control unit configured to:

receive partition identifiers from advertising routers on each of two or more RPL partitions on the same RPL subnet using a routing protocol, wherein each of the partition identifiers comprises a routing protocol advertisement that identifies an interface address of one of the advertising routers on the RPL subnet;

select one of the partition identifiers based on a comparison of interface addresses identified by the partition identifiers;

elect the active RPL partition as one of the two or more RPL partitions that includes the interface address of the one of the advertising routers identified by the selected one of the partition identifiers, wherein the active RPL partition is elected based on an interaction between a PIM protocol and the routing protocol executed at the router;

when the router is on the active RPL partition, operate as if the router is on a RPL for a rendezvous point address (RPA) in the RPL subnet; and when the router is on an inactive RPL partition, operate as if the router is on a regular link in the RPL subnet.

14. The router of claim 13, wherein the router is on the active RPL partition and operates as if the router is on the RPL, and wherein the control unit advertises a host route to the RPA using the routing protocol based on the interaction between the PIM protocol and the routing protocol executed at the router.

15. The router of claim 13, wherein, to advertise the host route to the RPA based on the interaction between the PIM protocol and the routing protocol executed at the router, the control unit is configured to:

receive, by a module of the control unit executing the routing protocol and from another module of the control unit executing the PIM protocol, instructions to treat the elected active RPL partition as the RPL; and in response to the instructions, advertise, by the module of the control unit executing the routing protocol, the host route to the RPA.

16. The router of claim 13, wherein the router is on the inactive RPL partition and operates as if the router is on a regular link, and wherein the control unit performs a designated forwarder (DF) election with the other routers on the inactive RPL partition to elect a DF for the inactive RPL partition.

17. The router of claim 13, wherein the control unit detects that an original RPL is separated into the two or more RPL partitions based on receipt of two or more partition identifiers for the same RPL subnet, wherein the partition identifiers comprise one of link state advertisements that identify interface addresses of the advertising routers on the RPL subnet that are reachable by the router for each of the RPL partitions or host route advertisements that identify interface addresses of the advertising routers on each of the RPL partitions.

18. The router of claim 13, wherein the partition identifiers are link state advertisements received from the advertising routers on the RPL partitions, and wherein the control unit:

receives a first link state advertisement with a first interface address of a first advertising router for the RPL subnet from the first advertising router on a first RPL partition;

receives a second link state advertisement with a second interface address of a second advertising router for the same RPL subnet from the second advertising router on a second RPL partition;

selects one of the first link state advertisement or the second link state advertisement based on a comparison of the first and second interface addresses; and elects the active RPL partition as the one of the first or second RPL partitions that includes the one of the first or second interface addresses identified by the selected one of the first or second link state advertisements.

19. The router of claim 13, wherein the router is on one of the RPL partitions, and wherein the control unit advertises a routing protocol advertisement that identifies an interface address of the router on the one or the RPL partitions as a partition identifier for the one of the RPL partitions.

20. The router of claim 13, wherein the partition identifiers are host route advertisements received from the advertising routers on the RPL partitions, and wherein the control unit:
    receives a first host route advertisement with a first host route address on the RPL subnet from a first advertising router on a first RPL partition;
    receives a second host route advertisement with a second host route address on the same RPL subnet from a second advertising router on a second RPL partition;
    selects one of the first host route advertisement or the second host route advertisement based on a comparison of the first and second host route addresses; and
    elects the active RPL partition as the one of the first or second RPL partitions that includes the one of the first or second host route addresses identified by the selected one of the first or second host route advertisements.

21. The router of claim 13, wherein the network is configured to include the two or more RPL partitions with the same RPL subnet as Anycast RPLs.

22. The router of claim 13, wherein an original RPL for the RPA is separated into the two or more RPL partitions due to a failure of the original RPL.

23. A non-transitory computer-readable storage medium comprising instructions that, when executed, cause one or more programmable processors to:
    receive, by a router on a rendezvous point link (RPL) subnet for bidirectional protocol independent multicast (PIM-BIDIR) in a network, partition identifiers from advertising routers on each of two or more RPL partitions with the same RPL subnet using a routing protocol, wherein each of the partition identifiers comprises a routing protocol advertisement that identifies an interface address of one of the advertising routers on the RPL subnet;
    select one of the partition identifiers based on a comparison of interface addresses identified by the partition identifiers;
    elect the active RPL partition as one of the two or more RPL partitions that includes the interface address of the one of the advertising routers identified by the selected one of the partition identifiers, wherein the active RPL partition is elected based on an interaction between a PIM protocol and the routing protocol executed at the router;
    when the router is on the active RPL partition, operate as if the router is on a RPL for a rendezvous point address (RPA) in the RPL subnet; and
    when the router is on an inactive RPL partition, operate as if the router is on a regular link in the RPL subnet.

24. The router of claim 13, wherein, to elect the active RPL partition based on the interaction between the PIM protocol and the routing protocol executed at the router, the control unit is configured to:
    receive, by a module of the control unit executing the routing protocol, the partition identifiers from the advertising routers on each of the two or more RPL partitions;
    elect, by another module of the control unit executing the PIM protocol, the active RPL partition based on the selected one of the partition identifiers received by the module executing the routing protocol; and
    send, by the another module of the control unit executing the PIM protocol and to the module of the control unit executing the routing protocol, instructions to treat the elected active RPL partition as the RPL.

25. The router of claim 13, wherein, to elect the active RPL partition based on the interaction between the PIM protocol and the routing protocol executed at the router, the control unit is configured to comprise:
    receive, by a module of the control unit executing the routing protocol, the partition identifiers from the advertising routers on each of the two or more RPL partitions;
    receive, by the module of the control unit executing the routing protocol and from another module of the control unit executing the PIM protocol, instructions to elect the active RPL partition based on the received partition identifiers; and
    in response to the instructions, elect, by the module of the control unit executing the routing protocol, the active RPL partition based on the selected one of the received partition identifiers.

\* \* \* \* \*